United States Patent
Yoshida

(10) Patent No.: US 9,200,916 B2
(45) Date of Patent: Dec. 1, 2015

(54) NAVIGATION DEVICE AND METHOD OF CHANGING ROUTE FOR NAVIGATION DEVICE

(75) Inventor: Yoshikazu Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/373,745

(22) PCT Filed: Feb. 23, 2012

(86) PCT No.: PCT/JP2012/054433
§ 371 (c)(1),
(2), (4) Date: Jul. 22, 2014

(87) PCT Pub. No.: WO2013/125013
PCT Pub. Date: Aug. 29, 2013

(65) Prior Publication Data
US 2014/0372025 A1    Dec. 18, 2014

(51) Int. Cl.
*G01C 21/36* (2006.01)
*G01C 21/34* (2006.01)

(52) U.S. Cl.
CPC .............. *G01C 21/36* (2013.01); *G01C 21/343* (2013.01); *G01C 21/3611* (2013.01); *G01C 21/3664* (2013.01)

(58) Field of Classification Search
CPC combination set(s) only.
See application file for complete search history.

(56) References Cited

U.S. PATENT DOCUMENTS

| | | | |
|---|---|---|---|
| 8,041,312 B2 | 10/2011 | Endo | |
| 2004/0260465 A1* | 12/2004 | Tu ................................ | 701/209 |
| 2005/0187707 A1* | 8/2005 | Yokota et al. ................. | 701/209 |
| 2006/0004599 A1 | 1/2006 | Endo | |
| 2009/0037101 A1* | 2/2009 | Koike et al. ................... | 701/209 |
| 2011/0035148 A1* | 2/2011 | Machino ....................... | 701/201 |
| 2012/0209506 A1* | 8/2012 | Tamayama et al. ........... | 701/410 |

FOREIGN PATENT DOCUMENTS

| | | | |
|---|---|---|---|
| CN | 1716819 | A | 1/2006 |
| CN | 102175252 | A | 9/2011 |
| JP | 9-184733 | A | 7/1997 |
| JP | 2000-337910 | A | 12/2000 |
| JP | 2008-96334 | A | 4/2008 |
| JP | 2010-190592 | A | 9/2010 |

* cited by examiner

*Primary Examiner* — Thomas Tarcza
*Assistant Examiner* — Edward Pipala
(74) *Attorney, Agent, or Firm* — Birch, Stewart, Kolasch & Birch, LLP

(57) ABSTRACT

It is an object of the present invention to improve the operability of the operation of changing a route by setting a new waypoint or destination point in a navigation device. To accomplish the object, the navigation device according to the present invention includes: a route searching unit that searches for a route from a departure point through waypoints to a destination point; a display controller that produces a screen display which allows one desired location among the departure point and at least one of the waypoints passed through to be designated as a new waypoint or destination point in one operation; and a route changing unit that changes the route searched for by the route searching unit in accordance with the designation performed by the one operation.

4 Claims, 7 Drawing Sheets

F I G . 7
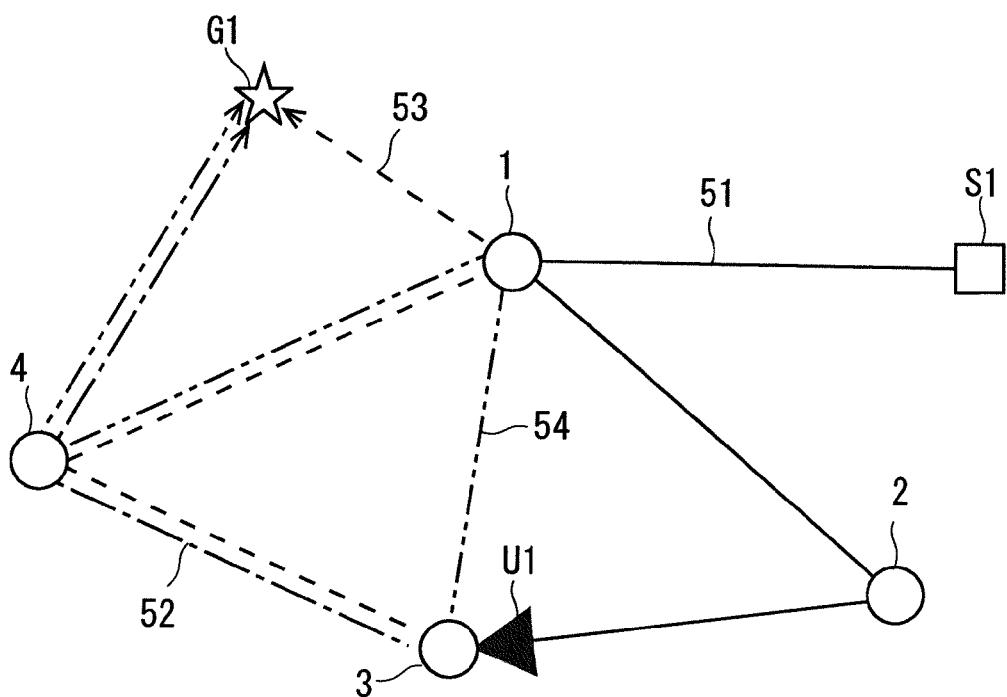

NAVIGATION DEVICE AND METHOD OF CHANGING ROUTE FOR NAVIGATION DEVICE

TECHNICAL FIELD

The present invention relates to a navigation technique for providing route guidance to a mobile object such as a motor vehicle, a bicycle and a person.

BACKGROUND ART

In recent years, there has been a widespread proliferation of a navigation device which searches for and presents a route from a departure point through a waypoint to a destination point to thereby guide a mobile object along the route searched for to the destination point. When the route searched for is changeable, such a navigation device is improved in convenience.

A navigation device capable of changing the route searched for by adding a new waypoint or destination point is disclosed in Patent Document 1. In this device, a location serving as a new waypoint or destination point is designated by inputting the name of a place and the like or specifying the position on a map screen. Next displayed are an image for selecting which one of the designated location and the registered waypoint and destination point is to be subjected to the editing of the order of arrival by the movement of a cursor, and an image for selecting which one of the processes of moving up and down the order of arrival is to be performed on the selected location by the movement of the cursor. A user repeats the operation of moving the cursor between these two images and the operation of moving the cursor in the two images, as appropriate, to set which order of arrival is used to register the designated location as the new waypoint or destination point. This device makes a route change by searching for a new route in accordance with the registered new waypoint or destination point.

PRIOR-ART DOCUMENTS

Patent Documents

Patent Document 1: Japanese Patent Application Laid-Open No. 2008-96334

SUMMARY OF INVENTION

Problem to be Solved by the Invention

However, the navigation device disclosed in Patent Document 1 requires the multi-step complicated operations to set the new waypoint or destination point. Thus, this device presents a problem in that the operations for the route change become heavy loads on the user.

The present invention has been made to solve these problems. It is an object of the present invention to provide a technique capable of improving the operability of the operation of changing a route by setting a new waypoint or destination point in a navigation device.

Means for Solving the Problems

A navigation device according to the present invention is a navigation device which includes: a route searching unit that searches for a route from a departure point through waypoints to a destination point; a display controller that produces a screen display which allows one desired location among the departure point and at least one of the waypoints passed through to be designated as a new waypoint or destination point in one operation; and a route changing unit that changes the route searched for by the route searching unit in accordance with the designation performed by the one operation, wherein the display controller produces the screen display which allows the designation of the one desired location and the designation of the order of arrival at the one desired location with respect to a current position, at least one of the waypoints not yet passed through and the destination point to be performed by the one operation, and displays a plurality of operating icons in matrix form on the screen display, and the route changing unit determines the order of arrival, based on any one of positional information about a row direction and positional information about a column direction of an icon selected from among the plurality of operating icons by the one operation, and determines the one desired location, based on the other positional information.

A method of changing a route for a navigation device according to the present invention includes: a route searching step that searches for a route from a departure point through waypoints to a destination point; a displaying step that produces a screen display which allows one desired location among the departure point and at least one of the waypoints passed through to be designated as a new waypoint or destination point in one operation; and a route changing step that changes the route searched for in the route searching step in accordance with the designation performed by the one operation, wherein the displaying step is a step of producing the screen display which allows the designation of the one desired location and the designation of the order of arrival at the one desired location with respect to a current position, at least one of the waypoints not yet passed through and the destination point to be performed by the one operation and displaying a plurality of operating icons in matrix form on the screen display, and the route changing step is a step of determining the order of arrival, based on any one of positional information about a row direction and positional information about a column direction of an icon selected from among the plurality of operating icons by the one operation, and determining the one desired location, based on the other positional information.

Effects of the Invention

According to the present invention, one desired location among the waypoint passed through and the departure point is designated as a new waypoint or destination point in one operation, and a route searched for is changed in accordance with the aforementioned designation. This improves the operability of the operation of changing a route by setting a new waypoint or destination point.

BRIEF DESCRIPTION OF DRAWINGS

FIG. 7 is a diagram for illustrating an example of the route change.

DESCRIPTION OF EMBODIMENTS

Figure 1:
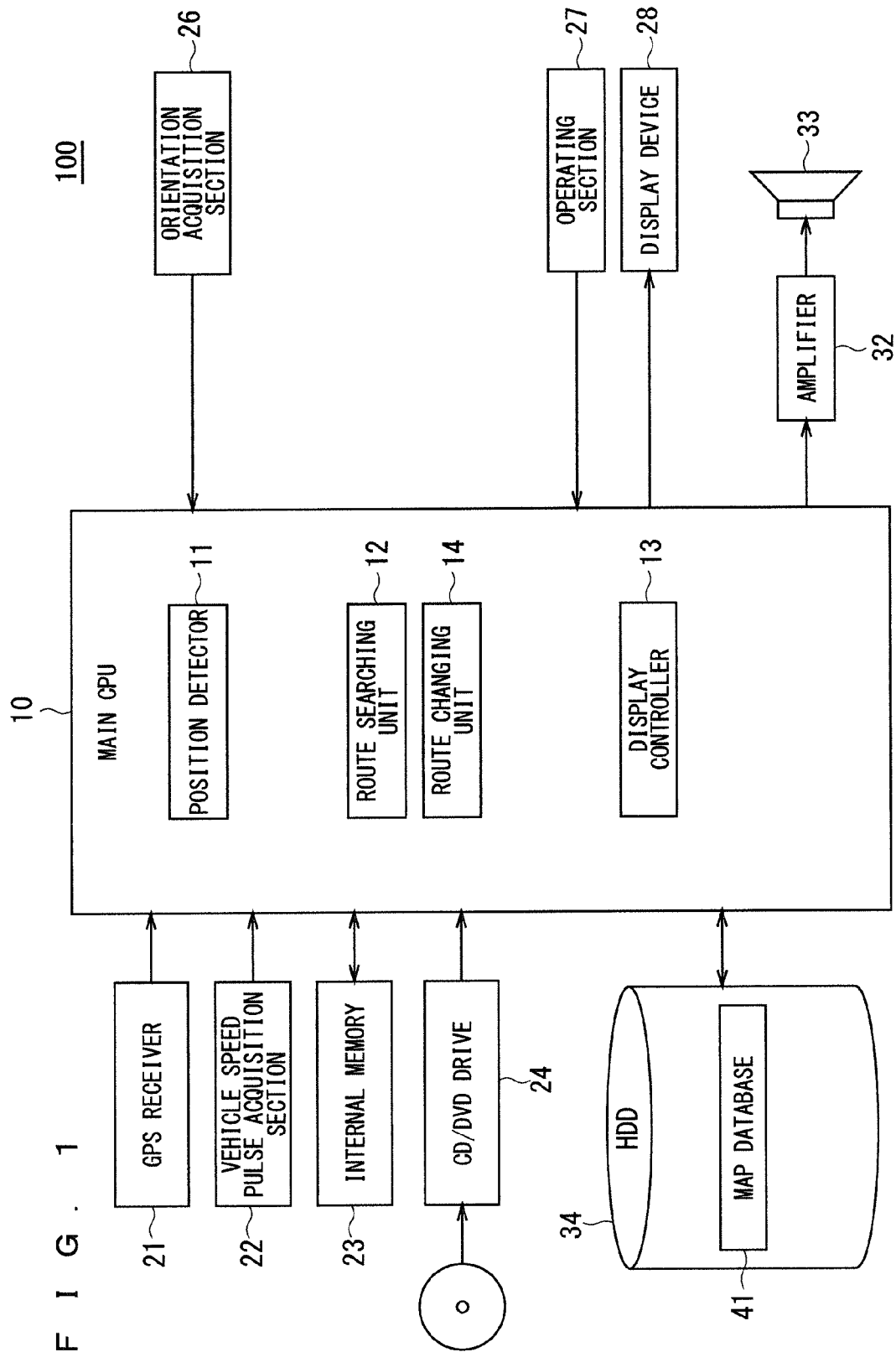
FIG. 1 is a block diagram showing an example of the configuration of a navigation device according to a first embodiment.

One embodiment according to the present invention will be described with reference to the drawings. In the drawings, like reference numerals and characters are used to designate pans similar in configuration and in function, and repetition in description is dispensed with in the following description. The drawings are shown schematically, and the size, positional relationship and the like of the illustrated objects are not precisely shown in the figures.

A. First Embodiment

<A-1. Overall Configuration of Navigation Device>

FIG. 1 is a block diagram showing an example of the configuration of a navigation device 100 for a vehicle as an example of a navigation device which provides route guidance to a mobile object according to a first embodiment. The navigation device 100 is a navigation device mounted on a vehicle, and includes a main CPU 10, a GPS receiver 21, a vehicle speed pulse acquisition section 22, an internal memory 23, a CD/DVD drive 24, an orientation acquisition section 26, a HDD 34 and the like. The main CPU 10 controls the components of the navigation device 100 in predetermined timed relation in accordance with stored programs to exercise the operation control of the entire navigation device 100. The GPS receiver 21 receives radio signals from a GPS satellite, and the vehicle speed pulse acquisition section 22 acquires vehicle speed pulses depending on the speed of a vehicle from the vehicle. The orientation acquisition section 26 acquires orientation information about the vehicle. A map database 41 is stored in the HDD 34. The main CPU 10 uses the internal memory 23 when executing programs. The CD/DVD drive 24 is illustrated as an example of a section that inputs map information stored in the map database 41.

The navigation device 100 further includes a display device 28 such as a liquid crystal display monitor which displays a map and the like, in addition to an operating section 27 serving as a user interface. The operating section 27 is formed by a touch panel placed on a screen of the display device 28, for example. The touch panel sends a signal depending on a touched position to the main CPU 10. Further, the operating section 27 may be formed by a joystick provided on the front surface of the navigation device 100 and an operating button such as a cross button. The navigation device 100 is configured so that a user operates the operating section 27 to make various settings including the setting and addition of a destination point and a waypoint and the setting of conditions for route searches. The navigation device 100 further includes an amplifier 32 and a loudspeaker 33 which serve as an audio output section.

A position detector 11 detects the current position of the vehicle on which the navigation device 100 is mounted at predetermined time intervals in order, for example, by using positional information acquired by the GPS receiver 21, the vehicle speed pulses acquired by the vehicle speed pulse acquisition section 22, orientation information acquired by the orientation acquisition section 26 and the like.

A route searching unit 12 searches for, for example, a route from a departure point through waypoints to a destination point, based on predetermined search conditions. The search conditions employed herein include various search conditions such as a condition for searching for the shortest distance route and a condition for searching for the shortest time route. The setting of the search conditions is performed previously by the user.

A display controller 13 displays a route searched for by the route searching unit 12 which is superimposed on a map on the display device 28. Also, the display controller 13 generates an image which allows one desired location among a waypoint passed through and the departure point to be designated as a new waypoint or destination point in one operation, to display the image on the display device 28. That is, the display controller 13 produces a screen display which allows one desired location among a waypoint passed through and the departure point to be designated as a new waypoint or destination point in one operation. The number of waypoints passed through is not less than one. More specifically, the display controller 13 produces a screen display which allows the designation of one desired location among a waypoint passed through among the waypoints and the departure point and the designation of the order of arrival at the one desired location with respect to the current position on the changed route, a waypoint not yet passed through among the waypoints and the destination point to be performed in one operation.

A route changing unit 14 searches for a new route in accordance with the aforementioned designations performed in one operation to change the route searched for by the route searching unit 12 as the new route.

<A-2. Operation of Navigation Device>

<A-2-1. Description about Route Change>

Figure 2:
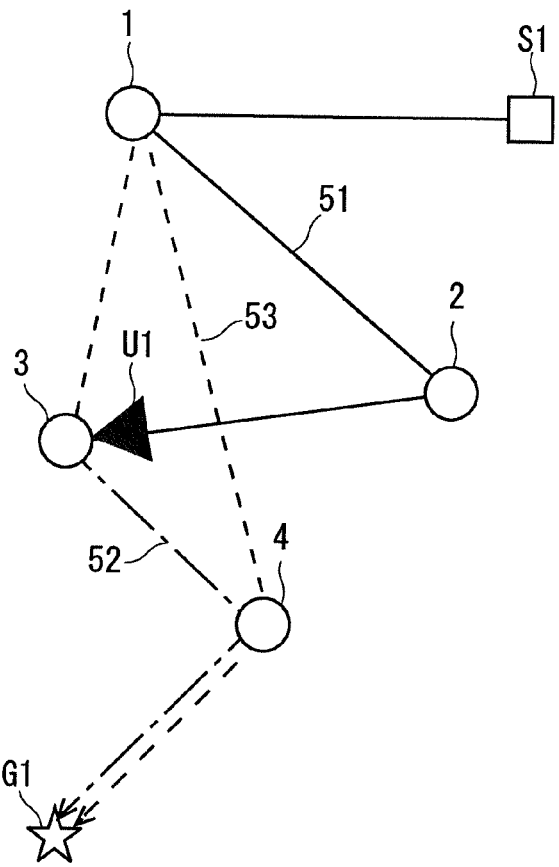
FIG. 2 is a diagram for illustrating an example of a route change.

FIG. 2 is a diagram for illustrating an example of the route change. The user at a departure point S1 operates the operating section 27 to set a destination point G1 and four waypoints (waypoints 1 to 4), and the navigation device 100 performs a route search based on the aforementioned setting. The search result calculated by the navigation device 100 is presented as a route 51 indicated by solid lines and a route 52 indicated by dash-dot lines. The user drives the vehicle in accordance with the guidance provided by the navigation device 100 based on the search result.

When there arises a need to return to the waypoint 1 already passed through after the vehicle is driven in accordance with the guidance to reach a current position U1 lying before the waypoint 3, it is necessary for the user to stop the current route guidance and to change the route setting. For example, when the user wants to make a change to a route such that, immediately after passing through the waypoint 3, the vehicle returns to the waypoint 1 and then travels through the waypoint 4 to the destination point as originally set, it is necessary that the route 52 after the waypoint 3 is changed to a route 53 as indicated by broken lines.

Figure 3:
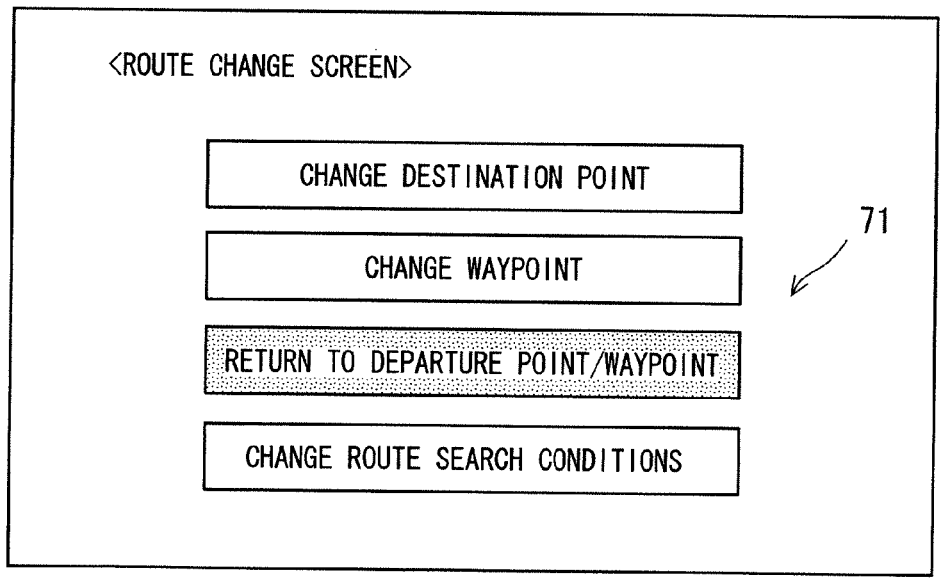
FIG. 3 is a view showing an example of a screen for an operation related to the route change.
Figure 4:
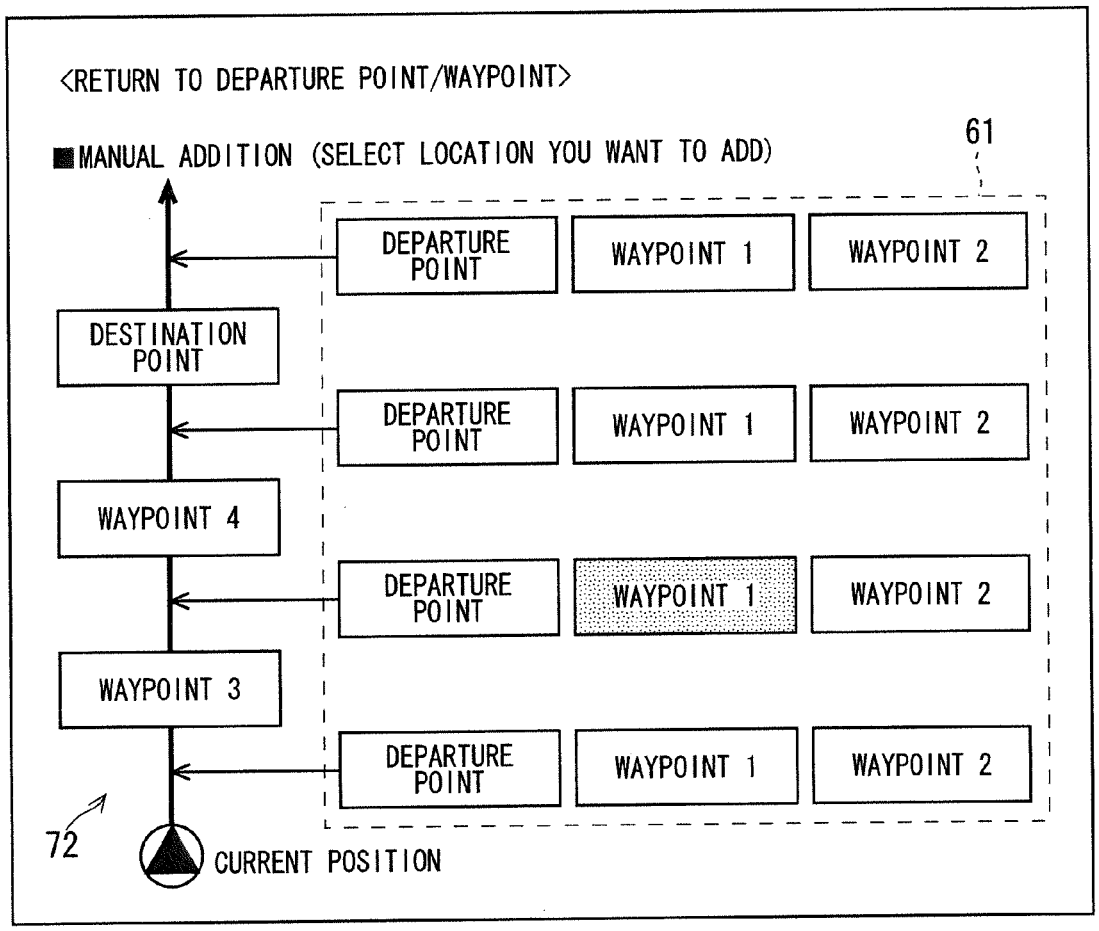
FIG. 4 is a view showing an example of the screen for the operation related to the route change.

FIG. 3 and FIG. 4 show a route change screen 91 and a designation screen 92, respectively, in the case where a route change is made at the current position U1 lying before the waypoint 3 as an example of the screens for an operation related to the route change.

For the route change during the guidance of a route, the main CPU 10 detects a touch of the touch panel of the operating section 27 and an operation of the operating button which are done by the user, and the display controller 13 displays the route change screen 91 including four icons 71 functioning as operating buttons on the display device 28. On a route change screen in a conventional device, a display which allows a change of the destination point and the waypoints or a change of the route search conditions is produced. However, a "Return to Departure Point/Waypoint" icon indicating the execution of a route change process returning to the departure point or a waypoint, in addition to the conventional display, is displayed on the route change screen 91 displayed by the navigation device 100 according to the first embodiment. When the "Return to Departure Point/Waypoint" icon is selected by operating the button or the touch of the screen, the main CPU 10 performs the route change process returning to the departure point or a waypoint. It should be noted that an icon shaded with dots is selected on the route change screen 91.

<A-2-2. Description about Operation Procedure>

Figure 5:
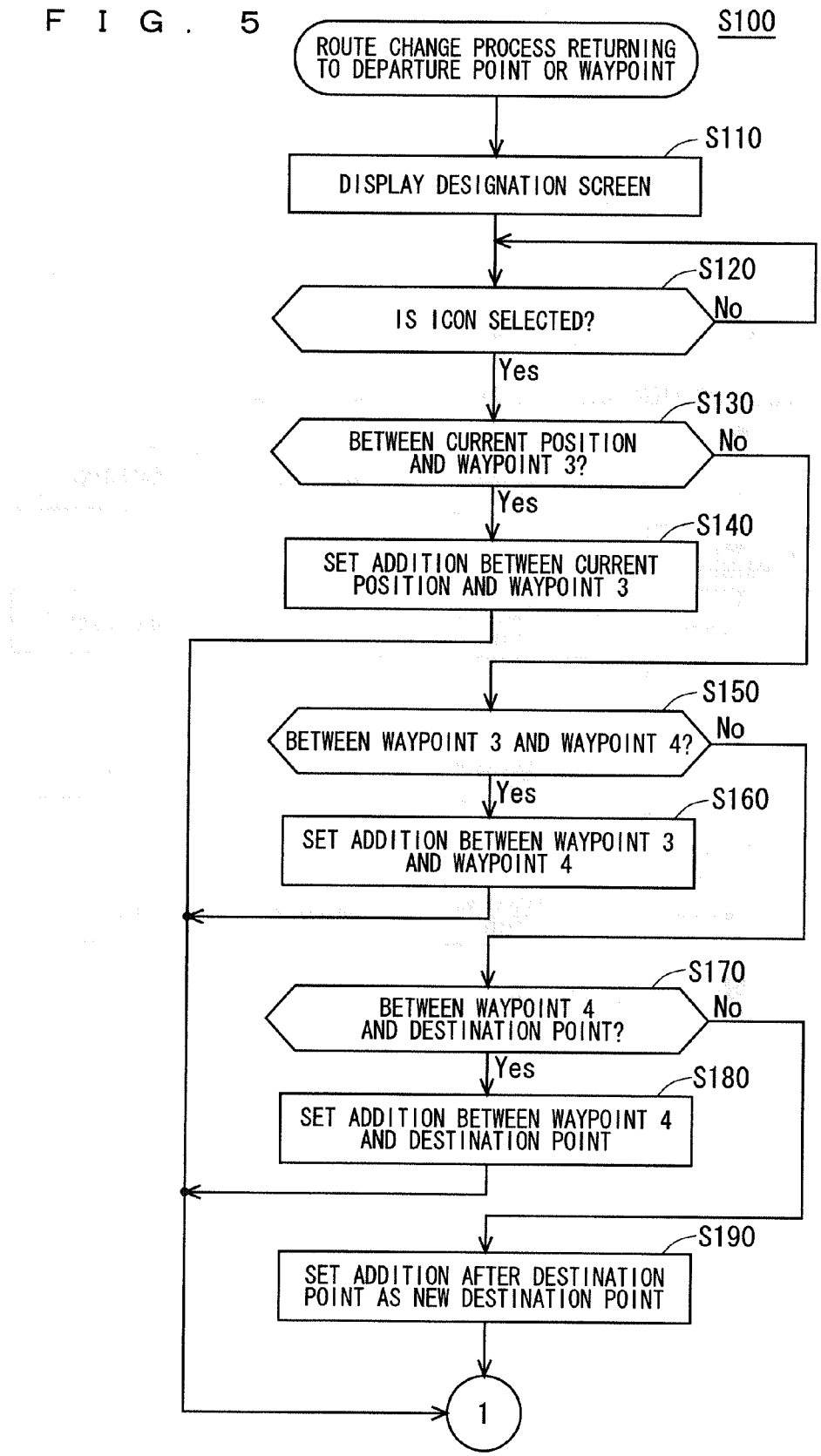
FIG. 5 is a flow diagram showing an example of the operation of the navigation device according to the first embodiment.
Figure 6:
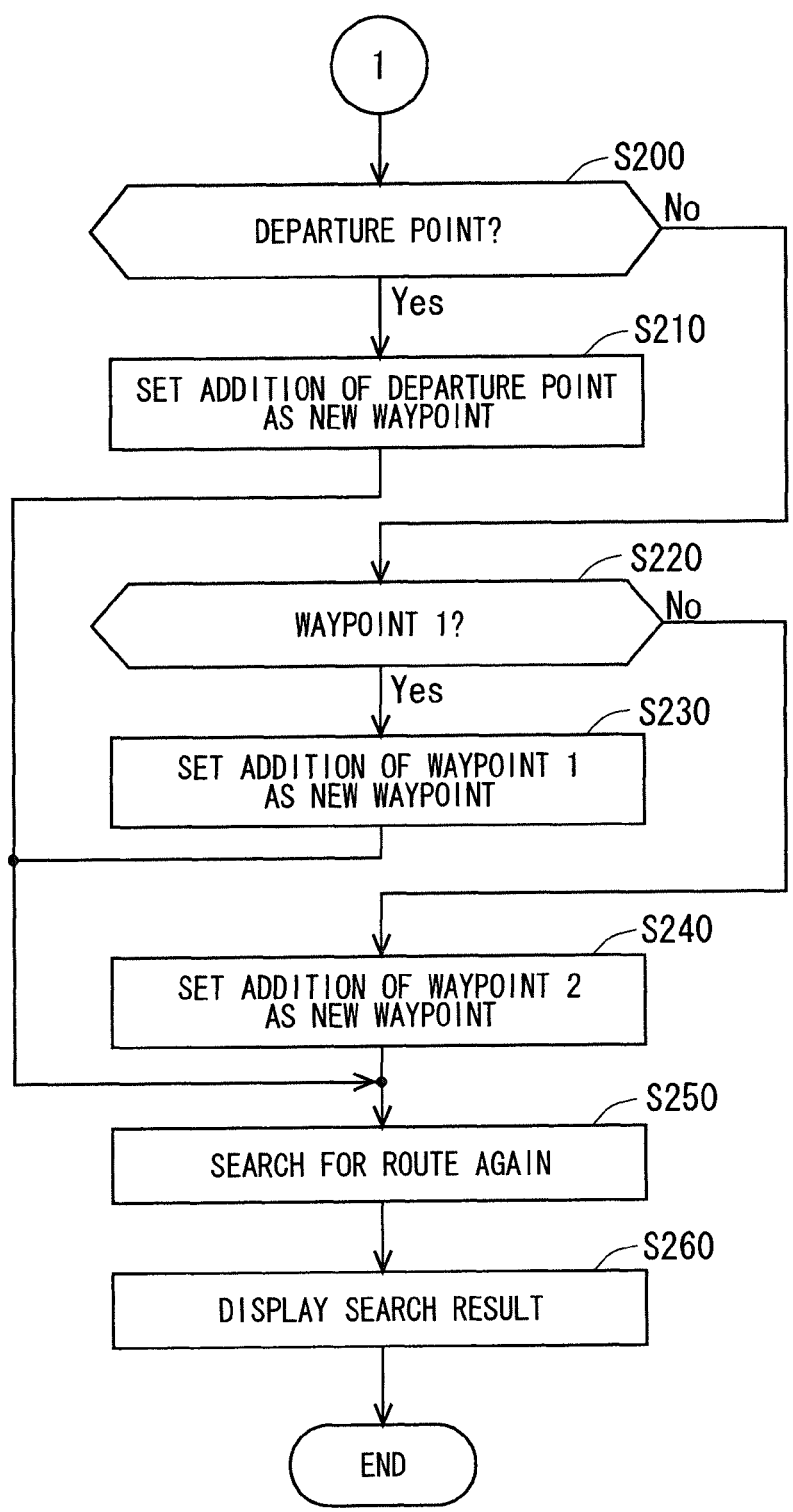
FIG. 6 is a flow diagram showing an example of the operation of the navigation device according to the first embodiment.

FIG. 5 and FIG. 6 are diagrams showing an operation procedure S100 as an example of the flow diagram of the operation performed by the navigation device 100 according to the first embodiment. The operation procedure S100 shows an operation procedure in the case where the route change process returning to the departure point S1 or to each of the waypoints 1 to 4 is performed at the current position U1 lying before the waypoint 3 as mentioned above among the various operations performed by the navigation device 100.

As shown in FIG. 5, after the start of the operation procedure S100, the display controller 13 displays the designation screen 92 (FIG. 4) which allows one desired location among the waypoints passed through and the departure point to be designated as a new waypoint or destination point in one operation on the display device 28 (Step S110).

Because the current position U1 (FIG. 2) at which a route change is made lies before the waypoint 3, an image 72 indicating a future driving course along the route 52 (FIG. 2) from the current position U1 in the order of the waypoint 3, the waypoint 4 and the destination point G1 is displayed on the designation screen 92. The image 72 is a list ("order list") representing the order of arrival ("arrival order") at the locations in the aforementioned driving course which is displayed as art image. Operating icons 61 in matrix form are displayed on the designation screen 92 so as to allow the user to select where the departure point S1 and the waypoints 1 and 2 passed through are to be added in the arrival order related to the route along which the vehicle is to be driven.

On the designation screen 92, one desired location among the waypoints 1 and 2 passed through and the departure point S1 is designated by one selecting operation performed on the icons 61. Also, the order of arrival at the one desired location with respect to the current position U1, the waypoints 3 and 4 not yet passed through and the destination point G1 is designated by the one selecting operation. The route changing unit 14 determines the order of arrival at the one desired location, based on positional information about the column direction of the icon selected by the one operation among the icons 61 in matrix form, and determines the one desired location among the departure point and the waypoints passed through, based on positional information about the row direction of the icon. The route changing unit 14 specifies such positional information from a signal sent from the operating section 27 in response to the operation of the user.

On the designation screen 92, the future driving course along the route 52 (FIG. 2) in the order of the current position U1, the waypoint 3, the waypoint 4 and the destination point G1 is displayed in the column direction of the icons 61 in matrix form in the image 72. However, the position of each icon constituting the icons 61 may be changed so that the driving course is displayed in the row direction of the icons 61 and so that the position in the row direction and the position in the column direction change places. In this case, the route changing unit 14 determines the order of arrival at the one desired location, based on the positional information about the row direction of the selected icon, and determines the one desired location among the departure point and the waypoints passed through, based on the positional information about the column direction of the icon. That is, the route changing unit 14 determines the order of arrival, based on one of the positional information about the row direction and the positional information about the column direction of the icon selected by the one operation among the operating icons 61, and determines the one desired location, based on the other positional information.

After the designation screen 92 is displayed in Step S110 (FIG. 5), the route changing unit 14 judges whether any one of the icons 61 is selected or not (Step S120). When no icon is selected, the route changing unit 14 repeats the process in Step S120. When any one of the icons 61 is selected, the route changing unit 14 judges whether the position of the selected icon is between the current position in the image 72 and the waypoint 3 or not (Step S130). When the position of the selected icon is between the current position in the image 72 and the waypoint 3, the route changing unit 14 performs the setting of adding a new location between the current position U1 and the waypoint 3 in the order list (Step S140), and the process proceeds to Step S200.

When the position of the selected icon is not between the current position and the waypoint 3 as a result of the judgment in Step S130, the route changing unit 14 judges whether the position is between the waypoint 3 and the waypoint 4 or not (Step S150). When the position is between the waypoint 3 and the waypoint 4, the route changing unit 14 performs the setting of adding a new location between the waypoint 3 and the waypoint 4 in the order list (Step S160), and the process proceeds to Step S200.

When the position of the selected icon is not between the waypoint 3 and the waypoint 4 as a result of the judgment in Step S150, the route changing unit 14 judges whether the position is between the waypoint 4 and the destination point or not (Step S170). When the position is between the waypoint 4 and the destination point, the route changing unit 14 performs the setting of adding a new location between the waypoint 4 and the destination point G1 in the order list (Step S180), and the process proceeds to Step S200. When the position is not between the waypoint 4 and the destination point G1, the route changing unit 14 performs the setting of adding a new location after the destination point G1 in the order list (Step S190) as a new destination point, and the process proceeds to Step S200.

When the process has proceeded to Step S200 (FIG. 6), the order of arrival at the location corresponding to the selected icon on the changed route is established with respect to the current position, the waypoints not yet passed through and the destination point. Next, the route changing unit 14 judges whether the selected icon is a "Departure Point" icon or not (Step S200). When the selected icon is the "Departure Point" icon, the route changing unit 14 performs the setting of adding the departure point S1 as a new waypoint (Step S210), and the process proceeds to Step S250.

When the selected icon is not the "Departure Point" icon, the route changing unit 14 judges whether the selected icon is a "Waypoint 1" icon or not (Step S220). When the selected icon is the "Waypoint 1" icon, the route changing unit 14 performs the setting of adding the waypoint 1 as a new waypoint (Step S230), and the process proceeds to Step S250. When the selected icon is not the "Waypoint 1" icon, the route changing unit 14 performs the setting of adding the waypoint 2 as a new waypoint (Step S240), and the process proceeds to Step S250.

When the process has proceeded to Step S250, the selection of one desired location serving as the new waypoint or destination point among the waypoints passed through and the departure point S1 is completed. Also, the order of arrival at the one desired location is established, as stated above. Thus, when the process has proceeded to Step S250, the one desired location among the waypoints passed through and the departure point S1 is designated as the new waypoint or destination point in one operation.

Next, the route changing unit 14 searches for a route again in accordance with the aforementioned designation (Step S250) to change the route searched for by the route searching unit 12 to the route searched for again. The display controller 13 displays the search result (Step S260), and the main CPU 10 completes the route change process.

When the user wants to return to the waypoint 1 after driving to the waypoint 3 in the example of the route shown in FIG. 2, the user selects the "Waypoint 1" icon from among the "Departure Point", "Waypoint 1" and "Waypoint 2" icons displayed in the row direction between the waypoint 3 and the waypoint 4 in the image 72. On the designation screen 92, the selected "Waypoint 1" icon is shaded with dots. In response to the selection, the route changing unit 14 searches for the route 53 directed through the waypoint 1 after the waypoint 3, through the waypoint 4 to the destination point, and changes the current route 52 to the new route 53 searched for.

For example, when the waypoint 2 is selected after (above) the destination point in the image 72 on the designation screen 92, the current destination point is changed to a new waypoint 5, and the waypoint 2 is changed to a new destination point. In accordance with these changes, a new route is set.

In the navigation device 100, a route change process returning to waypoints passed through may be performed. For example, when the user wants to return to the waypoints 1 and 2 passed through in the order named after the waypoint 4 and then to drive to the destination point G1, the user may first select a "Waypoint 1" icon between the waypoint 4 and the destination point in the image 72, and subsequently select a "Waypoint 2" icon between the waypoint 1 and the destination point in the image 72. In this case, for example, an "OK" icon indicating the completion of the selection of locations is provided on the designation screen 92, so that the completion of the operation of selecting the icons is detected.

<A-2-3. Another Route Change Returning to Departure Point or Waypoint>

FIG. 7 is a diagram for illustrating another example of the route change returning to the departure point or a waypoint. The user at the departure point S1 sets the destination point G1 and the four waypoints (waypoints 1 to 4), and the navigation device 100 searches for the route 51 indicated by solid lines and the route 52 indicated by dash-dot lines, based on the setting. The user drives the vehicle in accordance with the guidance provided by the navigation device 100 based on the search result.

When there arises a need to return to the waypoint 1 already passed through after the vehicle driven along the route 51 shown in FIG. 7 reaches the current position U1 lying before the waypoint 3, it is necessary for the user to stop the current route guidance and to change the route setting. The route 53 indicated by broken lines is a route returning to the waypoint 1 after the waypoint 4 and then reaching the destination point G1, and a route 54 indicated by dash-double-dot lines is a route passing through the waypoint 4 after returning to the waypoint 1 and then reaching the destination point G1. However, it is sometimes difficult for the user to judge which one of the route 53, the route 54 and another route reaching the waypoint 1 after the destination point G1 is good, as shown in FIG. 7.

Figure 8:
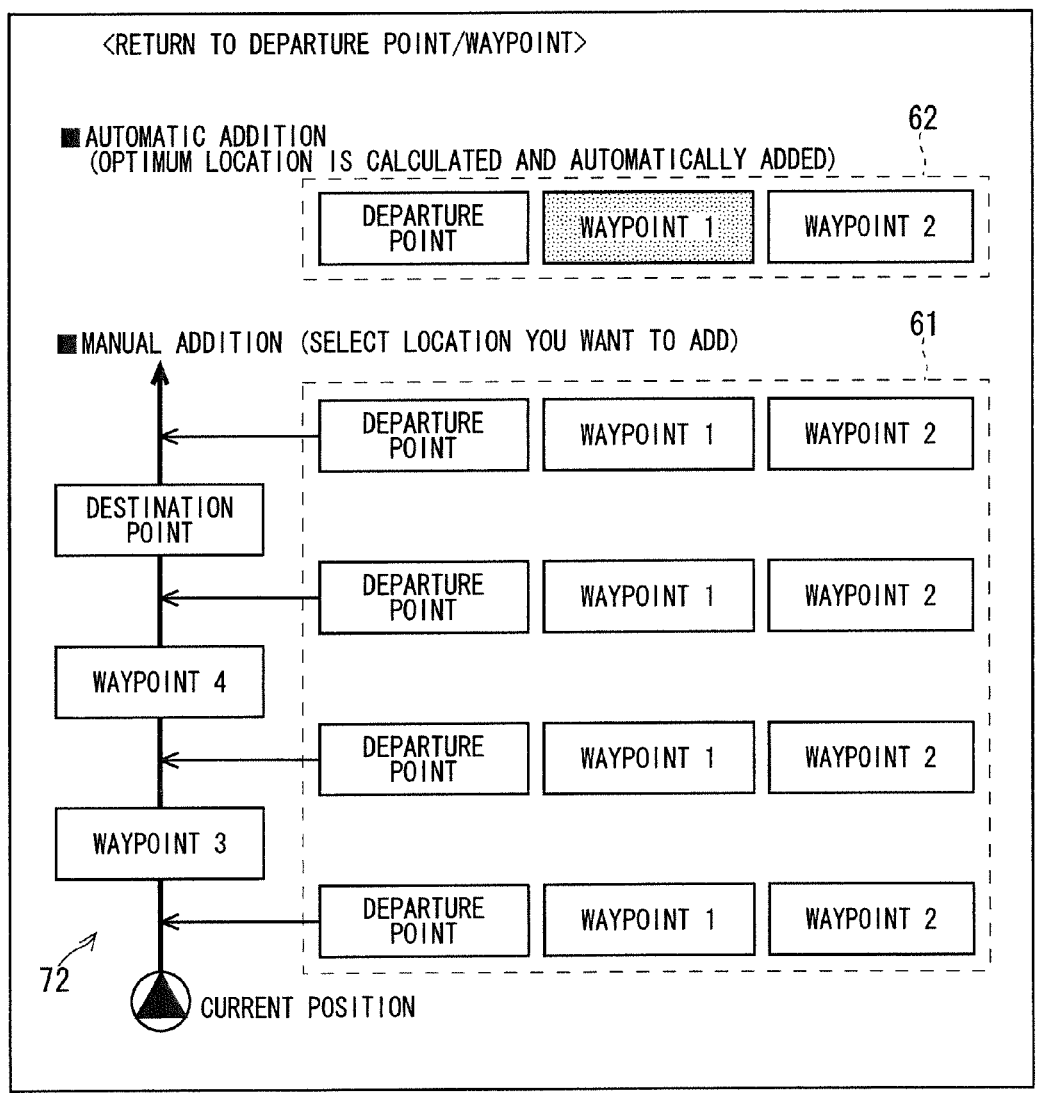
FIG. 8 is a view showing an example of the screen for operation.

FIG. 8 shows a designation screen 93 in the case where a route change is made at the current position U1 lying before the waypoint 3 as another example of the screens for the operation related to the route change. The display controller 13 of the navigation device 100 is capable of displaying the designation screen 93 which allows one desired location among the waypoints passed through and the departure point to be designated as a new waypoint or destination point in one operation on the display device 28 in Step S110 of the operation procedure S100. Like the designation screen 92, the designation screen 93 includes the image 72 and the operating icons 61 in matrix form. Thus, the navigation device 100 is capable of performing the operation procedure S100 also when displaying the designation screen 93.

The designation screen 93 further includes operating icons 62. One desired location employed as a new waypoint or destination point among the waypoints 1 and 2 passed through and the departure point S1 is designated by an operation performed on the operating icons 62. The order of arrival at the one desired location is not designated by this operation. The user performs the operation on the operating icons 62 to only select the location employed as the waypoint (or the departure point) to which the user wants to return. A portion in the order list where the selected location is added is determined in the optimum route search course by the navigation device 100. Then, the navigation device 100 searches for a new route to display the search result.

In the examples of the routes shown in FIG. 7, it is more suitable to return to the waypoint 1 after the waypoint 4 than after the waypoint 3. When the user selects the "Waypoint 1" icon among the operating icons 62 on the designation screen 93, the route changing unit 14 of the navigation device 100 searches for the route 53 as a new search route.

According to the navigation device according to the present embodiment having the aforementioned configuration, one desired location among the waypoints passed through and the departure point is designated as a new waypoint or destination point in one operation, and the route searched for by the route searching unit 12 is changed in accordance with the aforementioned designation. This improves the operability of the operation of changing a route by setting a new waypoint or destination point to reduce work loads on the user.

Also according to the navigation device according to the present embodiment having the aforementioned configuration, the operating icons 61 in matrix form are displayed. The route changing unit 14 determines one desired location among the departure point S1 and the waypoints passed through, based on one of the positional information about the row direction and the positional information about the column direction of the icon selected from among the operating icons 61 by one operation. The route changing unit 14 also determines the order of arrival at the one desired location on the new route, based on the other positional information. Thus, the operation of selecting the icon corresponding to the desired arrival order and location among the icons 61 is efficiently performed by the user.

Also according to the navigation device according to the present embodiment having the aforementioned configuration, when it is difficult to set the order of arrival at the location employed as a new waypoint or destination point, only the designation of the location may be performed. Then, the navigation device calculates the optimum order of arrival at the location to search for a new route. This reduces work loads on the user.

When the designation screen 92 (93) displayed as a single screen on the display device 28 degrades the operability of the designation screen 92 because there are a large number of waypoints, the designation screen 92 (93) is divided into a plurality of pages of the size which allows efficient work or is displayed in a scrollable manner, for example. In this case, the image including an icon desired to be selected is efficiently displayed by page turning or scrolling operation in an oblique direction of the matrix by means of the operating section 27 because the operating icons 61 are in matrix form. Thus, even if there are a large number of waypoints, the good operability of the navigation device 100 is maintained.

According to the present invention, the embodiment may be modified or dispensed with, as appropriate, within the scope of the present invention.

DESCRIPTION OF REFERENCE NUMERALS

12 Route searching unit, 13 Display controller, 14 Route changing unit, 61 Icons, 92 and 93 Designation screens, 100 Navigation device.

The invention claimed is:

1. A navigation device comprising:
a processor to execute a program; and
a memory to store the program which, when executed by the processor, results in performance of steps comprising,
searching for a route from a departure point through waypoints to a destination point;
producing a screen display which allows one desired location among said departure point and at least one of said waypoints passed through to be designated as a new waypoint or destination point in one operation; and
changing said route searched for in accordance with the designation performed by said one operation,
wherein said program results in performance of steps further comprising producing said screen display which allows the designation of said one desired location and the designation of the order of arrival at said one desired location with respect to a current position, at least one of said waypoints not yet passed through and said destination point to be performed by said one operation, displaying a plurality of operating icons in matrix form on said screen display, and
said one operation is an operation of selecting one icon among said plurality of operating icons, and
determining said order of arrival, based on any one of positional information about a row direction and positional information about a column direction of an icon selected from among said plurality of operating icons by said one operation, and determining said one desired location, based on the other positional information.

2. The navigation device according to claim 1,
wherein said program results in performance of steps further comprising displaying operating icons which allow the designation of only said one desired location among said order of arrival and said one desired location and which make said order of arrival arbitrary.

3. A method of changing a route for a navigation device, comprising:
searching for a route from a departure point through waypoints to a destination point;
producing a screen display which allows one desired location among said departure point and at least one of said waypoints passed through to be designated as a new waypoint or destination point in one operation; and
changing said route searched for in accordance with the designation performed by said one operation,
wherein producing said screen display which allows the designation of said one desired location and the designation of the order of arrival at said one desired location with respect to a current position, at least one of said waypoints not yet passed through and said destination point to be performed by said one operation, displaying a plurality of operating icons in matrix form on said screen display, and
said one operation is an operation of selecting one icon among said plurality of operating icons, and
determining said order of arrival, based on any one of positional information about a row direction and positional information about a column direction of an icon selected from among said plurality of operating icons by said one operation, and determining said one desired location, based on the other positional information.

4. A method of changing a route for a navigation device according to claim 3,
further comprising displaying operating icons which allow the designation of only said one desired location among said order of arrival and said one desired location and which make said order of arrival arbitrary.

* * * * *